(12) United States Patent
Shen

(10) Patent No.: US 7,158,980 B2
(45) Date of Patent: Jan. 2, 2007

(54) METHOD AND APPARATUS FOR COMPUTERIZED EXTRACTING OF SCHEDULING INFORMATION FROM A NATURAL LANGUAGE E-MAIL

(75) Inventor: Cheng-Chung Shen, Taipei Hsien (TW)

(73) Assignee: Acer Incorporated, Taipei (TW)

( * ) Notice: Subject to any disclaimer, the term of this patent is extended or adjusted under 35 U.S.C. 154(b) by 473 days.

(21) Appl. No.: 10/605,500

(22) Filed: Oct. 2, 2003

(65) Prior Publication Data
US 2005/0076037 A1    Apr. 7, 2005

(51) Int. Cl.
*G06F 7/00* (2006.01)
*G06F 17/30* (2006.01)

(52) U.S. Cl. .......................... 707/100; 707/102; 704/9
(58) Field of Classification Search ............ 705/1, 705/9; 707/1, 3, 100, 102; 704/1, 9
See application file for complete search history.

(56) References Cited

U.S. PATENT DOCUMENTS

| | | | |
|---|---|---|---|
| 6,016,478 A * | 1/2000 | Zhang et al. ................. | 705/9 |
| 6,035,278 A | 3/2000 | Mansour | |
| 6,094,681 A | 7/2000 | Shaffer | |
| 6,272,532 B1 | 8/2001 | Feinleib | |
| 6,505,167 B1 * | 1/2003 | Horvitz et al. ................. | 705/9 |
| 6,657,643 B1 * | 12/2003 | Horvitz et al. .............. | 715/764 |
| 6,816,885 B1 * | 11/2004 | Raghunandan .............. | 709/206 |
| 2002/0174185 A1 | 11/2002 | Rawat | |
| 2003/0182310 A1 * | 9/2003 | Charnock et al. ........ | 707/104.1 |
| 2004/0006547 A1 * | 1/2004 | Dehlinger et al. ............. | 707/1 |
| 2004/0030540 A1 * | 2/2004 | Ovil et al. ..................... | 704/1 |

\* cited by examiner

*Primary Examiner*—Hosain Alam
*Assistant Examiner*—Usmaan Saeed
(74) *Attorney, Agent, or Firm*—Winston Hsu

(57) ABSTRACT

A processor is connected to a storage device storing an incoming e-mail, a dependency database, and code for a calendar application. The dependency database can be built from an e-mail corpus containing a plurality of natural language e-mails containing scheduling information. The incoming e-mail is parsed by the processor to build a dependency tree containing word pairs from the e-mail that are found in the dependency tree. The word pairs are stored as dependency pairs in a tree structure in the dependency tree. A probability sum for the dependency tree is calculated to determine if the e-mail contains scheduling information. If the probability sum exceeds a predetermined value, the e-mail is assumed to contain scheduling information and the scheduling information is extracted from the dependency tree and exported to the calendar application.

16 Claims, 9 Drawing Sheets

From: nancy@acer.com
To: joseph@acer.com
Subject: Presentation details
Date: 2003/06/13 10:32 AM Dear Joseph, I've reserved your schedule and the video-conference room for the following :

1. 6/18 Finish the presentation material for each sub-program
2. 6/23 15:00 – 17:00: Review the integrated presentation material
3. 6/25 10:00 – 12:00: The first rehearsal Is this ok with you?
Should we meet tomorrow to go over the presentation material in person?

Regards,
Nancy

Fig. 1 Prior art

METHOD AND APPARATUS FOR COMPUTERIZED EXTRACTING OF SCHEDULING INFORMATION FROM A NATURAL LANGUAGE E-MAIL

BACKGROUND OF INVENTION

1. Field of the Invention

The invention relates to computerized extracting of scheduling information from an e-mail, and more particularly, to a method and apparatus for computerized extracting of scheduling information from a natural language e-mail for automatic entry into an electronic calendar.

2. Description of the Prior Art

Electronic devices are often used to help with personal organization. Calendars are often used to help us remember important dates in the future. Electronic calendar applications allow users to set events and alarms for particular dates and times in the future and automatically remind the user of the event.

Electronic mail (e-mail) has also become an important part of todays modern society. People use e-mail to keep in touch with family and friends as well as to conduct business correspondence. E-mail often contains information about scheduling events that users will want to put in a personal calendar application. Examples of such events include: meetings, conferences, seminars, appointments, engagements, deadlines, etc. FIG. 1 shows an example e-mail 100 containing scheduling information relating to a business presentation.

Upon reception of the e-mail 100, in order to remember the dates and times, the information listed for each event must be added to the calendar application. Because the e-mail 10 is a natural language (English) e-mail and does not follow a specific format recognized by the calendar application, the user must manually enter each event into the calendar. This is a time consuming and error prone operation. A need exists for an automatic agent that can help the user extract scheduling information from a natural language e-mail and directly export it to a calendar application.

In U.S. Pat. No. 6,035,278, Mansour describes a meeting scheduling tool provided for a user to search for an unscheduled time block, setup a meeting for the time block, and manage the schedule arrangement. The meeting scheduling tool can be connected to an e-mail system, however, this is only for notification purposes of meetings configured using the scheduling tool and does not address the method of gathering scheduling information from an incoming e-mail.

In U.S. Pat. No. 6,094,681, Shaffer, et al. describe an automated event notification apparatus including a data filter capable of analyzing data contained in e-mail messages, scheduling updates and requests transmitted to an electronic calendar of computer, and scheduling reminders transmitted by the electronic calendar. However, the automated event notification apparatus simply uses the data filter to determine whether an event has occurred or not. If the event has occurred, a user is notified using one of a plurality of notification methods. There is no provision for extracting information from scheduling updates other than to check for whether a certain event has occurred. The data filter makes a binary decision, and the event is determined to have either occurred or not occurred.

In U.S. Pat. No. 6,272,532, Feinleib describes a centralized electronic reminder system for parsing received e-mail messages to create reminder electronic messages. Natural language e-mails are received, parsed, and reminder information is extracted. When the date matches a date specified in the reminder information, the electronic reminder system constructs an e-message which is sent to a recipient specified in the reminder information. Although the electronic reminder system uses natural language e-mails, there is no ability to extract scheduling information from the e-mails to export to a personal calendar application. Additionally no detailed information is disclosed for a suitable method of parsing the e-mail to extract the desired scheduling information.

In published U.S. patent application No. 20020174185, Jai, et al. describe a centralized system for capturing electronic data by parsing incoming e-mail header and data content and, depending on the type of the e-mail, selectively extracting data from the e-mail and forwarding the extracted data according to user preferences. Although the system can use various formats and types of e-mails, there is no ability for a user to extract scheduling information from the e-mails to automatically export to a personal calendar application. Additionally, there is again no detailed information disclosed for a suitable method of parsing the e-mail to extract desired scheduling information.

The patents listed above do not help a user extract scheduling information and input the scheduling information to a calendar application located at the users location. Furthermore, there is a need for a suitable parsing method for natural language e-mails to allow scheduling information contained in the e-mail to be properly extracted.

SUMMARY OF INVENTION

It is therefore a primary objective of the claimed invention to provide a method and apparatus for computerized extracting of scheduling information from a natural language e-mail for automatic entry into a calendar application, to solve the above-mentioned problems.

According to the claimed invention, a method for computerized extracting of scheduling information from a natural language text for automatic entry into a calendar application is disclosed. The method comprises the following steps: (a) Parse the natural language text to build a dependency tree. (b) Determine if the natural language text contains scheduling information by calculating a probability sum for the dependency tree. (c) If the probability sum exceeds a predetermined value, extract scheduling information from the dependency tree and export the scheduling information to the calendar application.

According to the claimed invention, a personal organization apparatus comprising a processor for executing code in the personal organization apparatus, and a storage unit connected to the processor for storing data used by the processor including a natural language text. The processor parses the natural language text to build a dependency tree in the storage unit, determines if the natural language text contains scheduling information by calculating a probability sum for the dependency tree, and if the probability sum exceeds a predetermined value, extracts scheduling information from the dependency tree and exports the scheduling information to a calendar application.

These and other objectives of the claimed invention will no doubt become obvious to those of ordinary skill in the art after reading the following detailed description of the preferred embodiment that is illustrated in the various figures and drawings.

BRIEF DESCRIPTION OF DRAWINGS

FIG. 1 is an example natural language e-mail containing scheduling information according to the prior art.

DETAILED DESCRIPTION

Natural human languages are both varied and complicated, however, in any text understandable by a human, all elements of the text are related in a certain way. In or der to extract scheduling information from a natural language text, it is necessary to determine candidates for the scheduling information and decide whether these candidates contain scheduling information. The assumption is that information in a natural language appears in a specific pattern for specific types of information. According to the present invention, dependency grammar is used to define a base set of possible pattern structures. Dependency grammar defines this basic structure as word pairs (dependency pairs) and constructs larger patterns (dependency trees) using these dependency pairs. Incoming E-mail messages are parsed to gather dependency pairs applicable to scheduling information and the result is a possible scheduling event.

Figure 2:
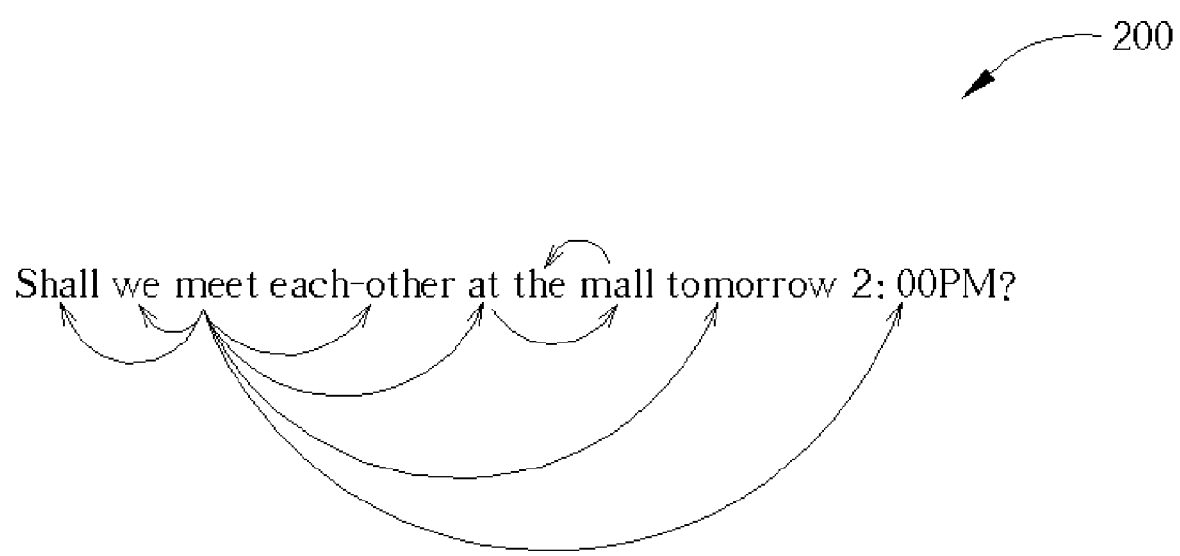
FIG. 2 is a dependency pair diagram for a sample sentence according to the present invention.

FIG. 2 shows a dependency pair diagram 200 for a sample sentence according to the present invention. According to dependency grammar, each word in a sentence has one and only one dominating head word. This forms a basic set of dependency pairs for each sentence as indicated with arrows, the arrow pointing from the head word to a dependent word. In FIG. 2, the word "meet" is the root of the sentence and is the head to "shall", "we", "each-other", "at", "tomorrow" and "2:00 PM". If "meet" can be identified as the root of the sentence, a dependency tree can be built for the sentence showing all the decedents (tails) of the root and subsequent dependency pairs.

Figure 3:
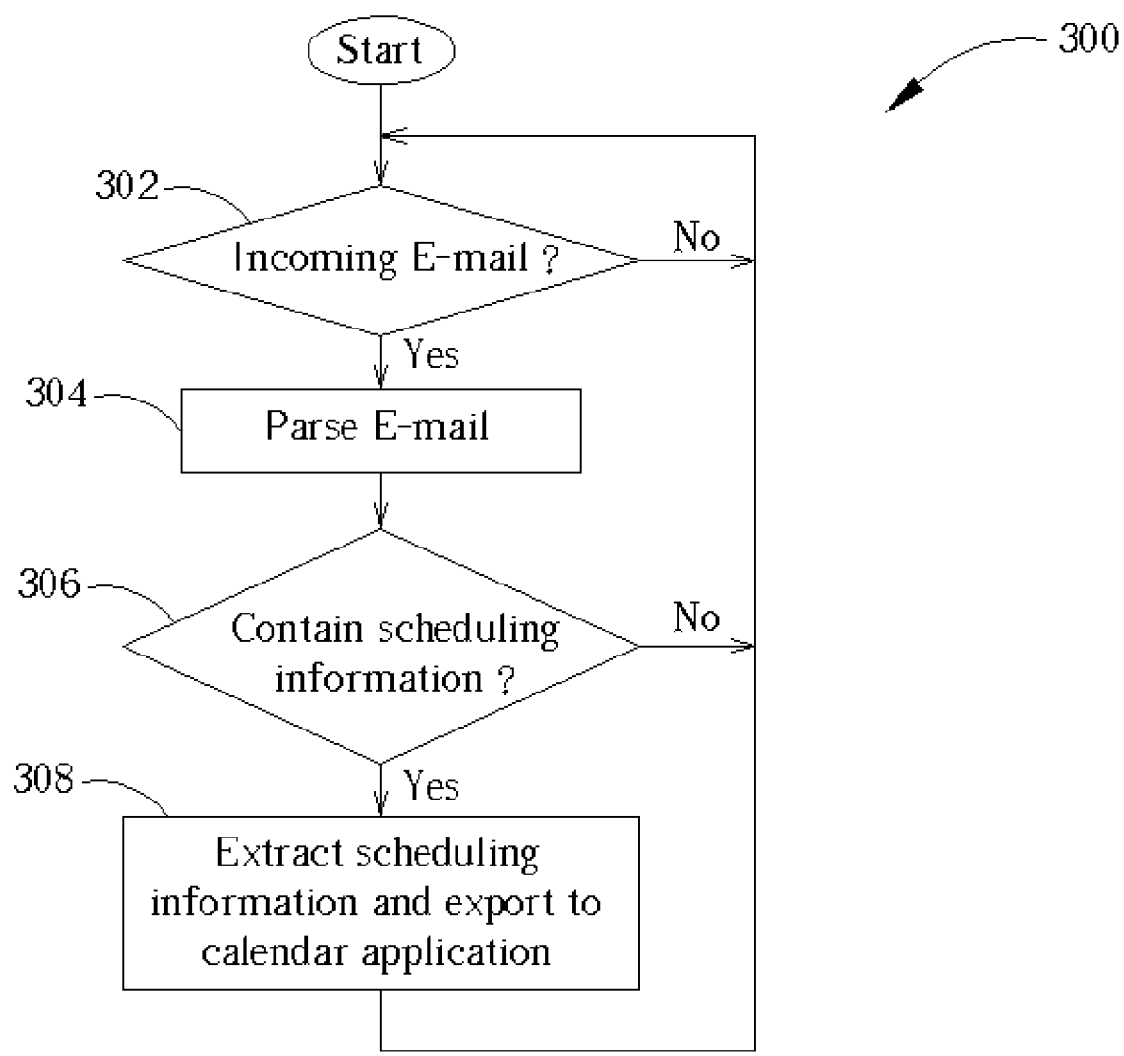
FIG. 3 is a flowchart describing extracting scheduling information from an incoming e-mail according to the present invention.

FIG. 3 shows a flowchart 300 describing using dependency grammar rules to extract scheduling information according to the present invention. The flowchart contains the following steps:

Step 302: Wait for an incoming e-mail to arrive. When a new e-mail arrives proceed to step 304.

Step 304: Parse the incoming e-mail to build a dependency tree and proceed to step 306.

Step 306: Determine if the e-mail contains scheduling information by calculating a probability sum for the dependency tree. Each dependency pair in the tree has an associated probability, which represents how often this particular word pair appears in natural language e-mails concerning scheduling information. If the probability sum exceeds a predetermined value then assume the e-mail contains scheduling information and proceed to step 308, otherwise return to step 302 to wait for the next incoming e-mail.

Step 308: Extract the scheduling information from the dependency tree, export the scheduling information to a calendar application, and when finished, return to step 302 to wait for the next incoming e-mail.

During the parsing step 302, the dependency tree does not need to contain every dependency pair from the e-mail but only the pairs relevant to scheduling information. This requires a decision to be made of whether each word pair is relevant to scheduling information. Additionally, for a given word pair, a decision must be made to determine which word is the most likely head word. In order to make these decisions, a dependency database is used as a reference. The dependency database contains a list of dependency pairs that are frequently found in a natural language e-mail corpus, and the e-mail corpus contains many e-mails containing scheduling information. Each dependency pair in the dependency database has an associated probability that corresponds to how often the particular word pair is found in the e-mail corpus. It should be noted that, in the preferred embodiment of the present invention, this probability is stored as a log-probability to facilitate adding the probabilities of different dependency pairs together.

Figure 4:
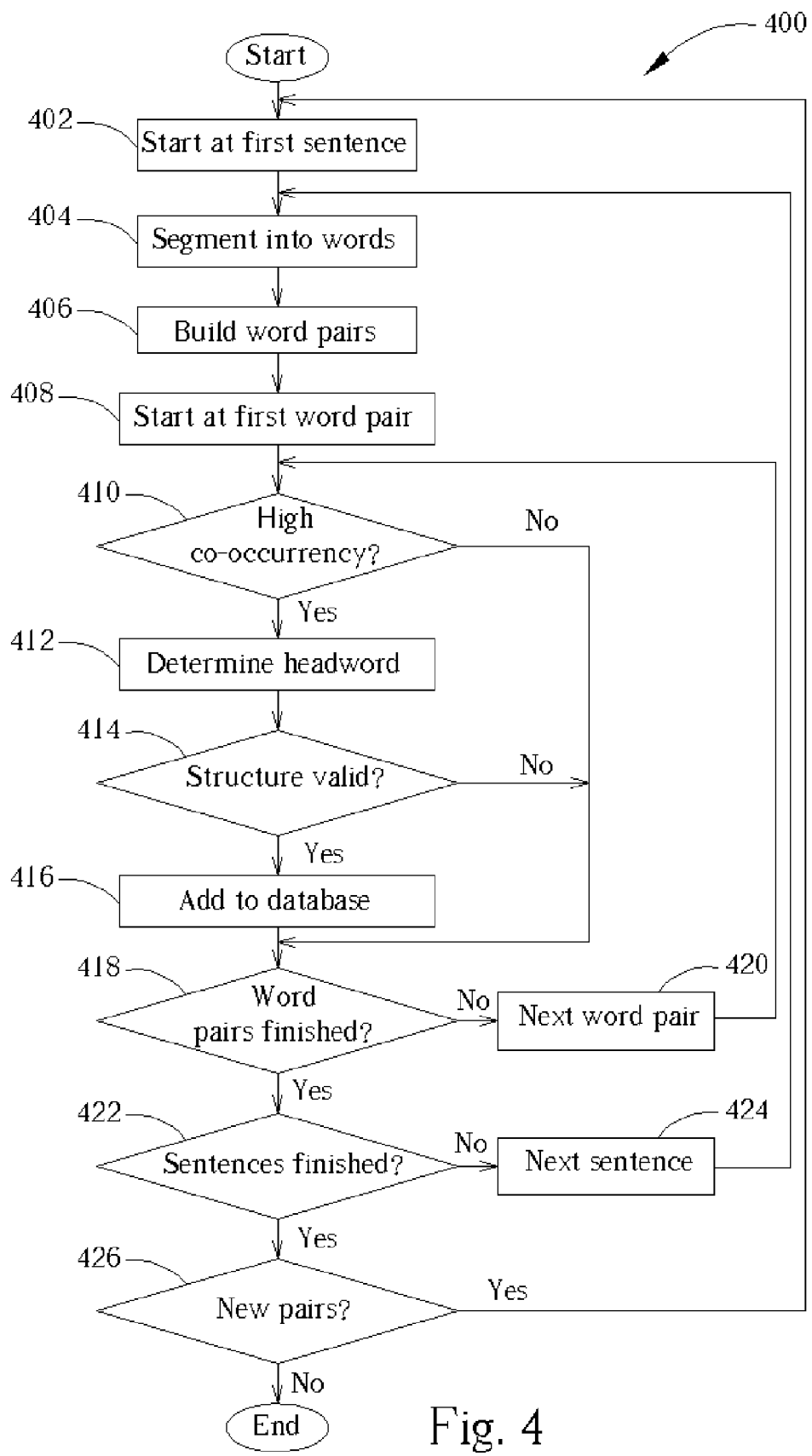
FIG. 4 is a flowchart describing how to build the dependency database used by the parsing step in FIG. 4.

FIG. 4 shows a flowchart 400 describing how to build the dependency database using an e-mail corpus, an associated tagged corpus, a head word list, and a set of violation rules. The e-mail corpus contains a plurality of sample natural language e-mails containing scheduling information. The tagged corpus specifies actual head words for sentences relevant to scheduling information in the e-mail corpus and contains dependencies for all other words in each sentence with respect to the head words. The head word list contains possible head words, and the violation constraints specify illegal dependency structures. Examples of possible illegal dependency structures include pronouns acting as head words to verbs, or adjectives acting as head words to nouns. The e-mail corpus, tagged corpus, head word list, and violation constraints are specified in advance and provided by the system designer. Building the dependency database is described in flowchart 400 and comprises the following steps:

Step 402: Start at the first sentence. Examine each sentence one by one starting with the first sentence. Proceed to step 404.

Step 404: Segment the sentence into words. Some languages use a base element other than words. For example, the Chinese language uses characters, and these characters must be grouped into words having meaning. This grouping is referred to as segmenting. Additionally, even in English, some words need to be paired with other words to form a proper meaning. For example, in FIG. 2, the word "each-other" is actually the words "each" and "other" grouped together to form a single word. As segmenting is well known to people skilled in the art, further description is hereby omitted. If segmenting is not required, step 404 can be removed from the flowchart 400, otherwise proceed to step 406 when finished.

Step 406: Build word pairs for the sentence. Make a list of all combinations of words in the sentence. Proceed to step 408.

Step 408: Start at the first word pair. Examine each word pair one by one starting with the first word pair. Proceed to step 410.

Step 410: Does the word pair occur frequently in the e-mail corpus? If yes then proceed to step 412, otherwise skip to step 418.

Step 412: Determine the head word. Check the head word list and the tagged corpus to determine which word in the word pair should be designated the head word. Proceed to step 414.

Step 414: Is the resulting word pair structure a valid dependency pair? Use the violation rules to determine if the syntax of the word pair is allowable. Additionally check the dependency database to ensure the word pair is not already included in the dependency database and to determine if this word pair structure should be added as a new dependency pair, e.g. this word pair fits with an existing dependency tree in the dependency database. If the word pair is a new and valid dependency pair then proceed to step 416, otherwise skip to step 418.

Step 416: Add the word pair as a dependency pair to the dependency database and proceed to step 418.

Step 418: Are the word pairs finished? If yes then proceed to step 422, otherwise proceed to step 420.

Step 420: Examine the next word pair and proceed to step 410.

Step 422: Are the sentences finished? If yes then proceed to step 426, otherwise proceed to step 424.

Step 424: Examine the next sentence and proceed to step 404.

Step 426: Was at least one new dependency pair added to the dependency database? If no then the dependency database is finished being built, otherwise repeat the procedure to look for next level dependency pairs by returning to step 402.

Figure 5:
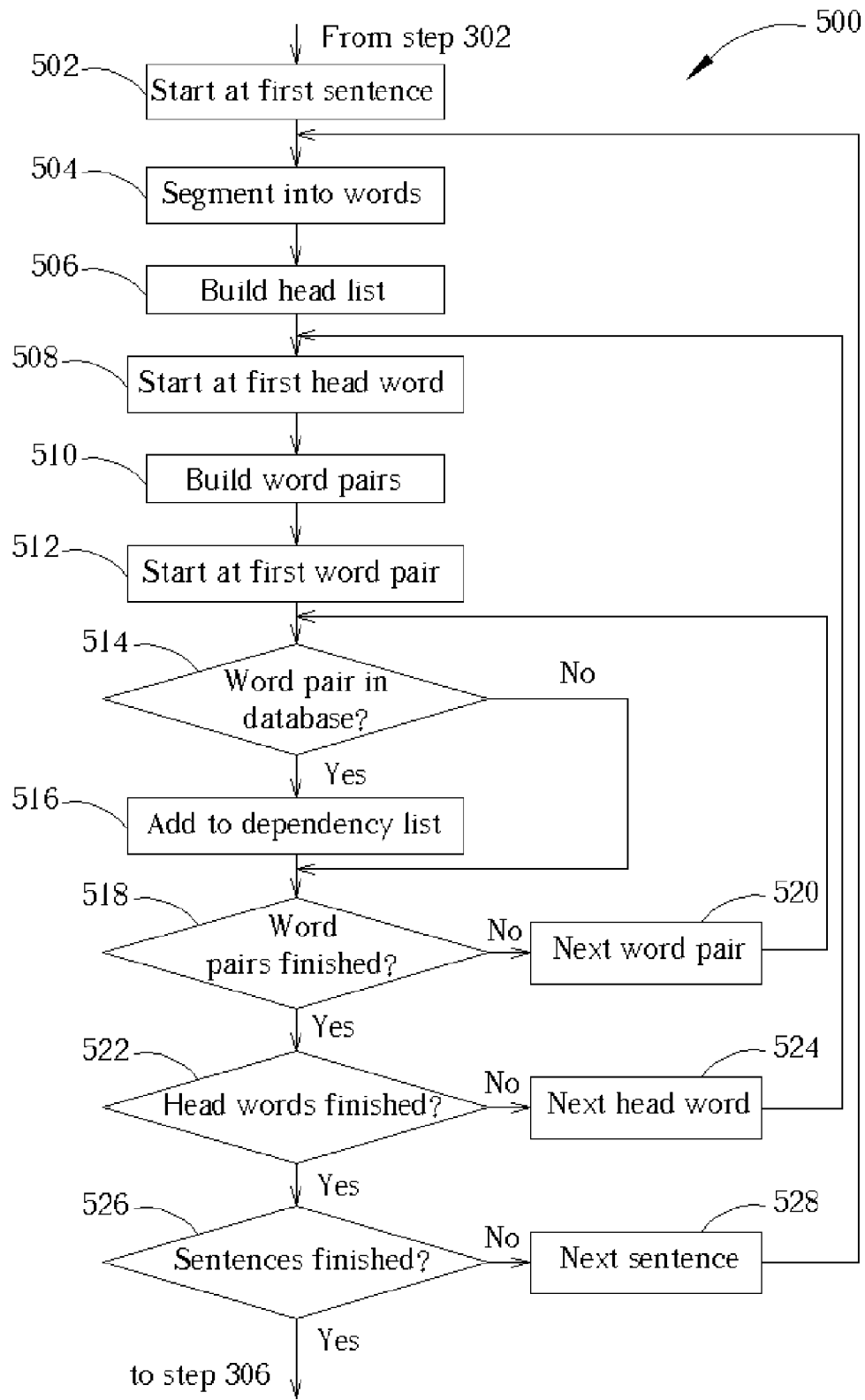
FIG. 5 is a flowchart describing the parsing step of FIG. 3.

FIG. 5 is a flowchart 500 describing the parsing step 304 of FIG. 3. Once the dependency database is built using the flowchart 400 shown in FIG. 4, the parsing step 304 of FIG. 3 can be broken down into the following steps:

Step 502: Start at the first sentence. Examine each sentence one by one starting with the first sentence. Proceed to step 504.

Step 504: Segment the sentence into words. This step is the same as step 404 in FIG. 4 and can similarly be omitted if not required. Proceed to step 506 when finished.

Step 506: Build a head word list. Use the dependency database to make a list of all words in the sentence that are possible head words. Proceed to step 508.

Step 508: Start at the first possible head word. Examine each head word one by one starting with the first possible head word. Proceed to step 510.

Step 510: Build word pairs for the sentence. Make a list of all two-word combinations of words in the sentence. Proceed to step 512.

Step 512: Start at the first word pair. Examine each word pair one by one starting with the first word pair. Proceed to step 514.

Step 514: Is the word pair in the dependency database? If yes then proceed to step 516, otherwise skip to step 518.

Step 516: Add the word pair as a dependency pair to the dependency tree. Proceed to step 518.

Step 518: Are the word pairs finished? If yes then proceed to step 522, otherwise proceed to step 520.

Step 520: Examine the next word pair, and proceed to step 514.

Step 522: Are the possible head words finished? If yes then proceed to step 526, otherwise proceed to step 524.

Step 524: Examine the next possible head word and proceed to step 508.

Step 526: Are the sentences finished? If yes then the parsing procedure is finished so proceed to step 306 in FIG. 3, if not then proceed to step 528.

Step 528: Examine the next sentence and proceed to step 504.

Figure 6:
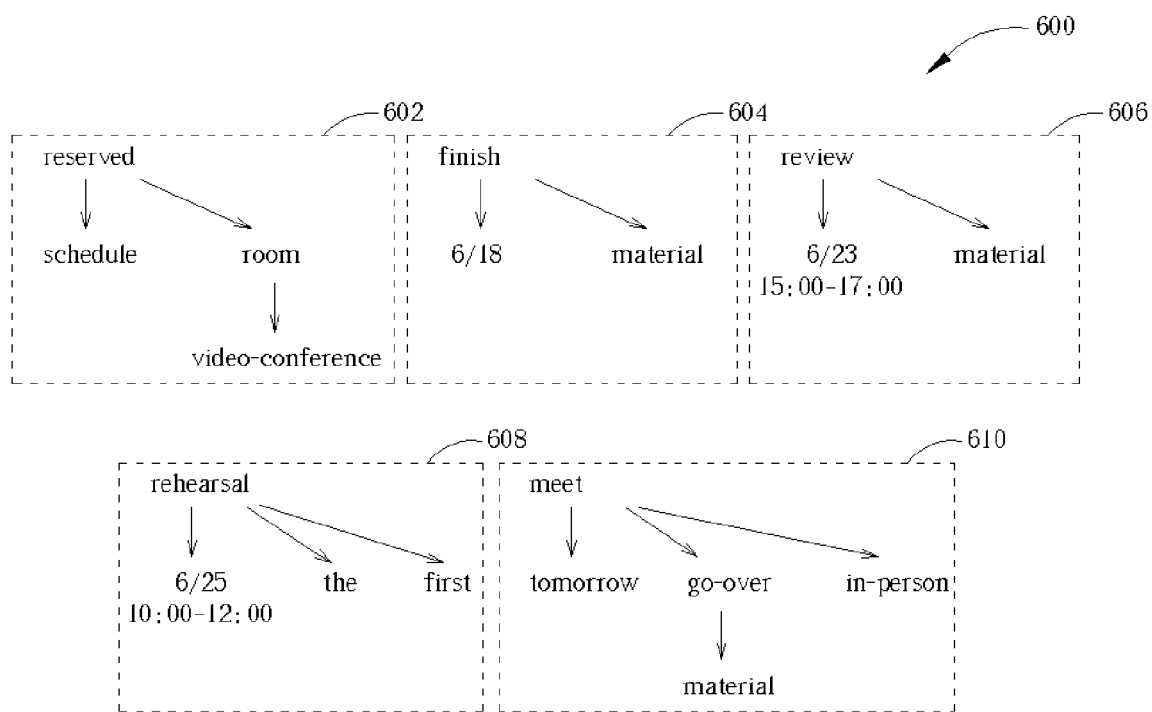
FIG. 6 is a dependency tree diagram for the e-mail of FIG. 1 according to the present invention.

FIG. 6 shows a dependency tree 600 for the e-mail 100 of FIG. 1 resulting from the parsing steps described in FIG. 5. Because there are multiple scheduling events contained in the same e-mail 100, there are actually five sub-trees 602, 604, 606, 608, and 610 listed in the dependency tree 600, and each sub-tree contains only the dependency pairs that relate to scheduling information as determined from the dependency database. The first sub-tree 602 is based on the root word "reserved", the second sub-tree 604 is based on the root word "finish", the third sub-tree 606 is based on the root word "review", the fourth sub-tree 608 is based on the root word "rehearsal", and the fifth sub-tree 610 is based on the root word "meet".

Figure 7:
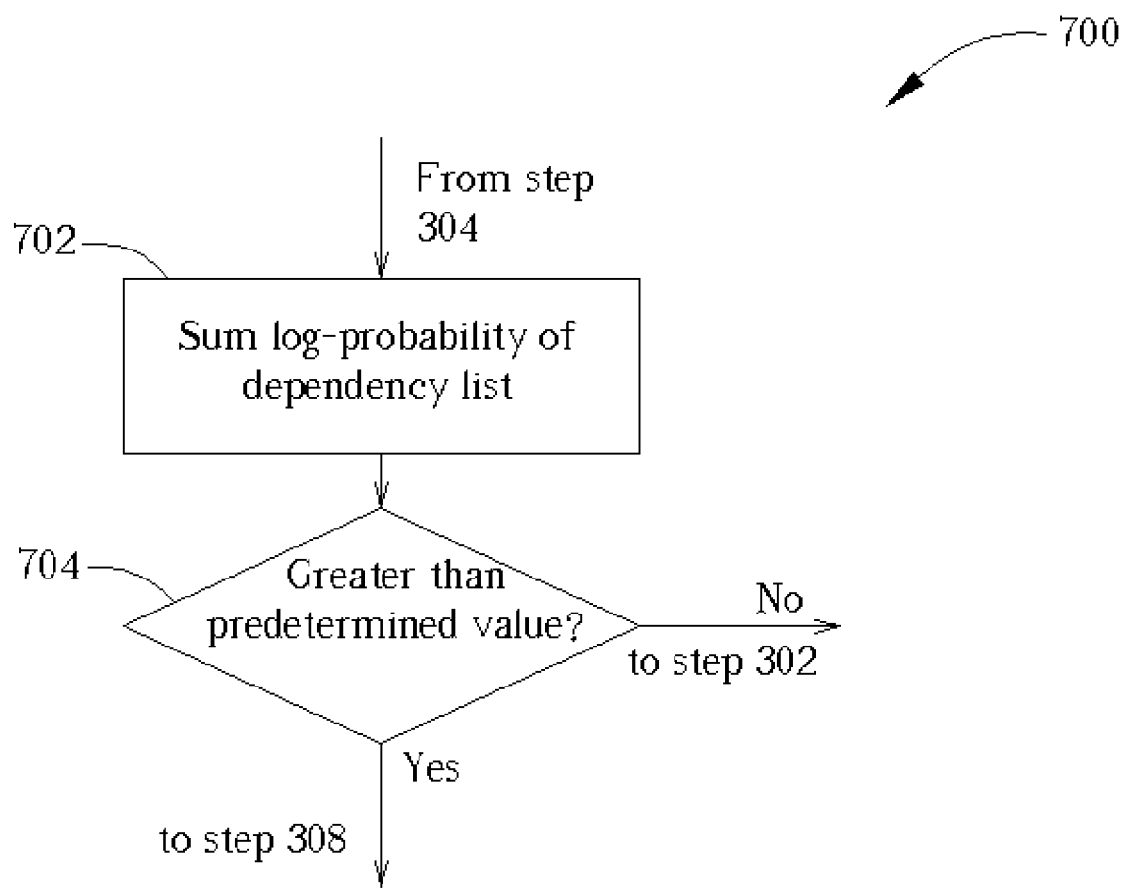
FIG. 7 is a flowchart describing the determining if the e-mail contains scheduling information step of FIG. 3.

FIG. 7 shows a flowchart 700 describing the determining if the e-mail contains scheduling information step 306 of FIG. 3 and contains the following steps:

Step 702: Sum the log-probability of the dependency tree and proceed to step 704.

Step 704: Is the log-probability sum greater than a predetermined value? If yes then assume the e-mail contains scheduling information and proceed to step 308 for extraction. If the log-probability sum is not greater than the predetermined value then assume the e-mail is unrelated to scheduling information and return to step 302 to wait for the next incoming e-mail.

Figure 8:
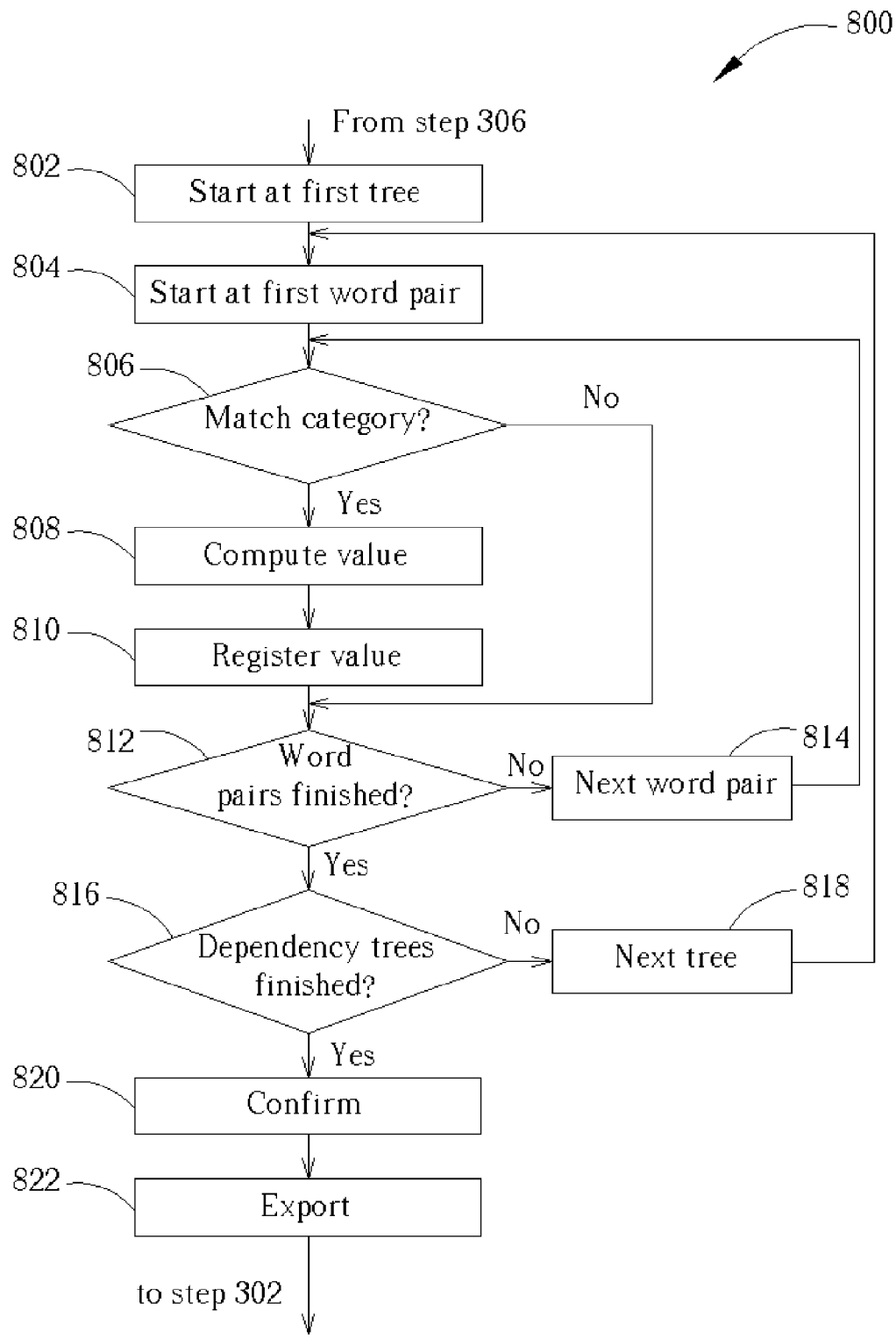
FIG. 8 is a flowchart describing the extract scheduling information step of FIG. 3.

FIG. 8 shows a flowchart 800 describing the extract scheduling information step 308 of FIG. 3 and contains the following steps:

Step 802: Start at the first dependency sub-tree in the dependency tree. Each sub-tree in the dependency tree contains scheduling information for a particular event so extract the scheduling information one by one starting with the first sub-tree. Proceed to step 804.

Step 804: Start at the first dependency pair. Examine each dependency pair one by one starting with the first dependency pair. Proceed to step 806.

Step 806: Does the category match a predetermined scheduling type? If yes then proceed to step 808, otherwise skip to step 812.

Step 808: Compute a scheduling value according to the scheduling type and proceed to step 810.

Step 810: Register the scheduling value with the application specific format required by the calendar application in an add list and proceed to step 812.

Step 812: Are the word pairs finished? If yes then proceed to step 816, otherwise proceed to step 814.

Step 814: Examine the next word pair and proceed to step 806.

Step 816: Are the dependency sub-trees finished? If yes then proceed to step 820, otherwise proceed to step 818.

Step 818: Examine the next dependency sub-tree and proceed to step 804.

Step 820: Confirm the add list with the user. The user may want to modify the scheduling information in the add list before it is export to the calendar application. When the information in the add list is confirmed by the user, proceed to step 822.

Step 822: Export the scheduling information contained in the add list to the calendar application. When finished, return to step 302 to wait for the next incoming e-mail.

Figure 9:
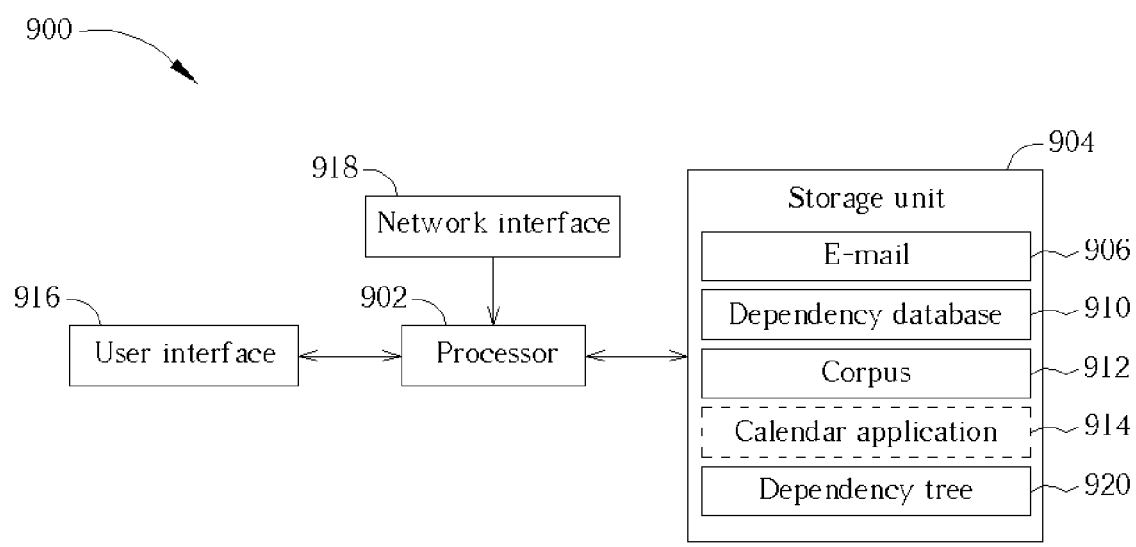
FIG. 9 is a block diagram of a personal organization apparatus for implementing the flowchart of FIG. 3.

FIG. 9 shows a block diagram of a personal organization apparatus 900 for implementing the flowchart 300 of FIG. 3. A personal organization apparatus includes electronic devices that assist with scheduling and can include such devices as desktop computers, laptops computers, notebooks, personal digital assistants (PDAs), and cell phones. The personal organization apparatus 900 includes a processor 902 and a storage unit 904 connected to the processor. The storage unit 904 provides storage capability for an incoming e-mail 906, a dependency database 910, and code for a calendar application 914. Optionally, a natural language e-mail corpus 912 can also be stored in the storage unit to allow the personal organization apparatus 900 to build the dependency database 910. Additionally, a user interface 916 and a network interface 918 are connected to the processor for interfacing with a user and for receiving the incoming e-mail 906 respectively. The storage unit 904 can be implemented with a memory device such as a RAM, a storage device such as magnetic or optical media, or a combination of different types of memory and storage devices.

A natural language e-mail 906 is received from the network interface 918 and stored in the storage unit 904 by the processor 902. The e-mail 906 is parsed by the processor 902 to build the dependency tree 920. The dependency tree 920 contains word pairs from the e-mail 906 that are found in the dependency database 910, and the word pairs are stored as dependency pairs in a tree structure in the dependency tree 920. Each sub-tree in the dependency tree 920 deals with word pairs that are dependent on a common root head word. For most scheduling e-mails, this means each sub-tree contains information particular to a particular scheduling event.

When all the word pairs in the e-mail 906 have been checked, the processor 902 sums a log probability of the dependency pairs in the dependency tree 920. Each dependency pair has an associated probability value also stored (preferable in log probability form) in the dependency tree, the probability value corresponding to how frequently this particular word pair was found in the e-mail corpus 912. More frequently appearing word pairs are given higher probability of indicating whether or not the e-mail 906 contains scheduling information. If the log probability sum is higher than a predetermined value, the e-mail 906 is assumed to contain scheduling information. In this case the processor 902 extracts the scheduling information by recursively checking each dependency pair in each sub-tree of the dependency tree 920. For each dependency pair, the processor 902 checks to see if the dependency pair matches a scheduling category that needs conversion to a scheduling value. Examples of such values are words like "tomorrow", or "next week". Depending on the date of the e-mail, these words need to be converted to an actual date. Next, the processor 902 registers the value of the dependency pair with the format specific requirements for the calendar application 914. For example, if the dependency pairs are stored in the form (head, tail), given required calendar application 914 parameters of PERSON, PLACE, TIME, SUBJECT, the dependency pairs of FIG. 6 could be grouped and processed as follows:

(reserved, schedule)
(reserved, room)→PLACE=room
(room, video-conference)→PLACE=video-conference room
(finish, 6/18)→TIME=6/18
(finish, material)→SUBJECT=finish material
(review, 6/23 15:00–1700)→TIME=6/23 15:00–1700
(review, material)→SUBJECT=review material
(rehearsal, 06/25 10:00–12:00)→TIME=6/25 10:00–12:00
(rehearsal, the)→SUBJECT=the rehearsal
(rehearsal, first)→SUBJECT=the first rehearsal
(meet, tomorrow)→TIME=06/14
(meet, go-over)→SUBJECT=go-over
(go-over, material)→SUBJECT=go-over material
(meet, in-person)→PERSON=Nancy When each dependency pair for each sub-tree in the dependency tree 920 has been registered in an add list, the list can be confirmed with the user using the user interface 916. The user is presented with the prospective add list and given an opportunity to modify the scheduling information contained in the add list. For example, the user may wish to change the time for a meeting to an earlier time to prevent tardiness. Once confirmed by the user, the processor 902 exports the add list to the calendar application 914 using the proprietary format of the particular calendar application 914. The processor 902 may also be required to confirm the calendar application 914 is ready to receive the new scheduling information and may need to send a confirmation message to the calendar application 914. Additionally, it should be noted that using dependency grammar rules, the processor 902 could build the dependency database 910 using the plurality of natural language e-mails containing scheduling information stored in the e-mail corpus 912.

In contrast to the prior art, the method and apparatus for computerized extracting of scheduling information according to the present invention can extract scheduling information from a natural language e-mail and export the extracted scheduling information to a calendar application. Dependency grammar rules are used to specifically identify and connect the words of each sentence having to do with scheduling information. The scheduling information is extracted by recursively examining word pairs having to do with the scheduling information contained in the e-mail. Additionally, although the previous detailed description deals specifically with natural language e-mails, the same method and apparatus could be directly used for any natural language texts.

Those skilled in the art will readily observe that numerous modifications and alterations of the device may be made while retaining the teachings of the invention. Accordingly, that above disclosure should be construed as limited only by the metes and bounds of the appended claims.

What is claimed is:

1. A method for computerized extracting of scheduling information from a natural language text for automatic entry into a calendar application, the method comprising the following steps:

(a) parsing the natural language text to build a dependency tree by segmenting each sentence in the natural language text into words, building the dependency tree containing dependency pairs by comparing word pairs in the natural language text with a dependency database, and adding the word pairs found in the dependency database as dependency pairs to the dependency tree;

(b) determining if the natural language text contains scheduling information by calculating a probability sum for the dependency tree; and (c) if the probability sum exceeds a predetermined value, extracting scheduling information from the dependency tree and exporting the scheduling information to the calendar application;

wherein building the dependency database includes the following steps:

segmenting each sentence in a text corpus into words, wherein the text corpus contains a plurality of sample natural language texts containing scheduling information;

for each sentence in the text corpus, checking all possible combinations of word pairs to determine if the word pair has a high co-occurrence in the text corpus;

if the word pair has the high co-occurrence in the text corpus, determining a head word using a tagged corpus, and checking the validity of the word pair using violation constraints, wherein the tagged corpus specifies actual head words for sentences relevant to scheduling information in the text corpus and contains dependencies for all other words with respect to the actual head words, and the violation constraints specify illegal dependency structures;

if the word pair is a valid dependency pair, computing a probability of the word pair, adding the word pair as a dependency pair to the dependency database, and adding the probability of the dependency pair to the dependency database, wherein the probability of the dependency pair corresponds to a frequency of the word pair in the text corpus; and repeating the above steps until no new dependency pairs are identified.

2. The method of claim 1, wherein when building the dependency tree:

for each sentence in the natural language text, forming a head word list of all possible head words in the sentence; and pairing each word in each sentence in the natural language text with the possible head words in the head word list to form the word pair, wherein if the word pair formed by the word and a possible head word is found in the dependency database, adding the word pair formed by the word and the possible head word as the dependency pair to the dependency tree.

3. The method of claim 1, wherein determining if the natural language text contains scheduling information further comprises calculating the probability sum for the natural language text by adding up probabilities for all the dependency pairs in the dependency tree, the probability of each dependency pair corresponding to the frequency of the dependency pair in the text corpus, the text corpus containing a plurality of sample natural language texts containing scheduling information.

4. The method of claim 1, wherein after extracting scheduling information from the natural language text, the method further comprising computing a value for the scheduling information.

5. The method of claim 1, wherein after extracting scheduling information from the natural language text, the method further comprising sending a confirmation message to a user to confirm the scheduling information.

6. The method of claim 1, wherein exporting the extracted scheduling information to the calendar application further comprises sending a confirmation message to the calendar application.

7. The method of claim 1, wherein the natural language text is a natural language e-mail.

8. A personal organization apparatus comprising:

a processor for executing code in the personal organization apparatus; and a storage unit connected to the processor for storing data used by the processor including a natural language text, the storage unit including a dependency database, the dependency database specifying a plurality of dependency pairs and a corresponding probability of each dependency pair, each dependency pair being a word pair found in a text corpus, the probability of the dependency pair corresponding to a frequency of the word pair in the text corpus, and the text corpus including a plurality of sample natural language texts containing scheduling information;

wherein the processor parses the natural language text to build a dependency tree in the storage unit, determines if the natural language text contains scheduling information by calculating a probability sum for the dependency tree, and if the probability sum exceeds a predetermined value, extracts scheduling information from the dependency tree and exports the scheduling information to a calendar application;

the processor also builds the dependency tree in the storage unit containing dependency pairs by comparing word pairs in the natural language text with the dependency database and adding the word pairs found in the dependency database as dependency pairs to the dependency tree, calculates the probability sum for the natural language text by adding up probabilities for all the dependency pairs in the dependency tree, and if the probability sum exceeds a predetermined sum, extracts scheduling information from the dependency tree and exports the scheduling information to the calendar application; and the processor further builds the dependency database using the text corpus, wherein for each sentence in the text corpus, the processor checks all possible combinations of the word pairs to determine if the word pair has a high co-occurrence in the text corpus; if the word pair has the high co-occurrence in the text corpus, the processor determines a head word using a tagged corpus, and checks the validity of the word pair using violation constraints, wherein the tagged corpus specifies actual head words for sentences relevant to scheduling information in the text corpus and contains dependencies for all other words with respect to the actual head words, and the violation constraints specify illegal dependency structures; and if the word pair is a valid dependency pair, the processor determines the frequency of the word pair in the text corpus and adds the word pair as the dependency pair to the dependency database and adds the frequency of the word pair as the probability of the dependency pair to the dependency database.

9. The personal organization apparatus of claim 8, wherein when the processor builds the dependency tree:

for each sentence in the natural language text, the processor forms a head word list of all possible head words in the sentence, the head word list being stored in the storage unit; and the processor pairs each word in each sentence in the natural language text with the possible head words in the head word list, wherein if the word pair formed by the word and the possible head word is found in the dependency database, the processor adds the word pair formed by the word and the possible head word as the dependency pair to the dependency tree.

10. The personal organization apparatus of claim 8, wherein the processor repetitively builds the dependency database until no new dependency pairs are identified.

11. The personal organization apparatus of claim 8, wherein when building the dependency database the processor further segments each sentence in the text corpus into words.

12. The personal organization apparatus of claim 8, wherein the processor further segments each sentence in the natural language text into words.

13. The personal organization apparatus of claim 8, wherein after extracting scheduling information from the natural language text, the processor computes a value for the scheduling information.

14. The personal organization apparatus of claim 8, wherein after extracting scheduling information from the natural language text, the processor sends a confirmation message to a user interface module to confirm the scheduling information.

15. The personal organization apparatus of claim 8, wherein when the processor exports the scheduling information to the calendar application, the processor further sends a confirmation message to the calendar application.

16. The personal organization apparatus of claim 8, wherein the natural language text is a natural language e-mail.

* * * * *